United States Patent
Hessling et al.

(10) Patent No.: US 7,035,732 B2
(45) Date of Patent: Apr. 25, 2006

(54) METHOD FOR A USER-DEFINED SETTING OF A DRIVER INFORMATION SYSTEM

(75) Inventors: Matthias Hessling, Hildesheim (DE); Bernd Petzold, Edemissen (DE); Cornelius Hahlweg, Gotha (DE); Gerd Draeger, Braunschweig (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/297,560

(22) PCT Filed: Jun. 8, 2001

(86) PCT No.: PCT/DE01/02122

§ 371 (c)(1),
(2), (4) Date: Apr. 16, 2003

(87) PCT Pub. No.: WO01/94888

PCT Pub. Date: Dec. 13, 2001

(65) Prior Publication Data

US 2003/0149514 A1    Aug. 7, 2003

(30) Foreign Application Priority Data

Jun. 8, 2000    (DE) .................................. 100 28 457

(51) Int. Cl.
*G06F 7/00* (2006.01)
(52) U.S. Cl. ...................... 701/209; 701/200; 701/210; 701/204
(58) Field of Classification Search ............... 701/1, 701/200, 201, 210, 204; 340/994, 981, 439, 340/438, 995
See application file for complete search history.

(56) References Cited

U.S. PATENT DOCUMENTS

| | | | | |
|---|---|---|---|---|
| 5,648,898 A | * | 7/1997 | Moore-McKee et al. | ...... 700/86 |
| 5,919,246 A | * | 7/1999 | Waizmann et al. | ......... 701/209 |
| 6,098,015 A | * | 8/2000 | Nimura et al. | .............. 701/209 |
| 6,198,996 B1 | * | 3/2001 | Berstis | ........................ 701/36 |
| 6,232,874 B1 | * | 5/2001 | Murphy | ................. 340/426.19 |
| 6,233,506 B1 | * | 5/2001 | Obradovich et al. | ........... 701/1 |
| 6,275,231 B1 | * | 8/2001 | Obradovich | ................. 701/36 |
| 6,591,188 B1 | * | 7/2003 | Ohler | ......................... 701/209 |

FOREIGN PATENT DOCUMENTS

| | | |
|---|---|---|
| DE | 42 11 556 | 10/1993 |
| DE | 198 39 378 | 3/2000 |
| EP | 0 704 675 | 4/1996 |
| EP | 0803705 A2 | * 10/1997 |
| JP | 10 026 538 | 1/1998 |
| JP | 10 318 771 | 12/1998 |

* cited by examiner

*Primary Examiner*—Thomas G. Black
*Assistant Examiner*—Christine M. Behncke
(74) *Attorney, Agent, or Firm*—Kenyon & Kenyon LLP (57) ABSTRACT

The method is used for the user-defined setting of a driver information system (10), in which data are stored and are retrievable for making a decision. In this context, it is provided that a user-defined decision matrix (26) is set up which is adjustable as a function of operating data and is retrievable for making a preliminary decision with the aid of the information system (10).

15 Claims, 1 Drawing Sheet

METHOD FOR A USER-DEFINED SETTING OF A DRIVER INFORMATION SYSTEM

The present invention relates to a method for the user-defined setting of a driver information system, in which data are stored and are retrievable for making a decision, according to the definition of the species in claim 1.

BACKGROUND INFORMATION

Methods of the kind named at the beginning are known. They are drawn upon especially for setting navigational and telematic systems. In this context, the setting of such systems is done by the vehicle user himself by manual input into an appropriate device or by parametrization of generally valid experiential values. As a matter of disadvantage, in various operating situation, using such information systems, appropriate decisions are repeatedly interrogated by the vehicle user or not correctly arrived at by the information system.

SUMMARY OF THE INVENTION

The method according to the present invention is characterized by setting up a user-defined decision matrix which is adjustable as a function of operating data and retrievable for the purpose of making a preliminary decision with the aid of the information system. In this connection, operating data are understood to mean all vehicle data, operating and/or user-relevant data which are able to be meaningful for making a preliminary decision with the aid of the information system. Since the decision matrix includes user-defined information or data, it may be used for making a user-defined preliminary decision. In this context, in the case of a preliminary decision, a prediction by the information system is involved, with respect to the individual behavior of a vehicle user that will occur with great probability in each respective operating or traffic situation. Because of the constant adjustment of the user-defined decision matrix, the probability that a preliminary decision or prediction made will actually be correct is relatively high.

Advantageously, the driver information system works as a navigation system. Since a navigation system frequently requests preliminary decisions of a vehicle user or must make preliminary decisions itself, a user-specific, adjusted decision matrix is particularly suitable for being integrated into a navigation system, since the latter can, in this way, make preliminary decisions without the user of the vehicle having to do anything with respect to these preliminary decisions. Thus, the user of the vehicle is less distracted from his surroundings, particularly while driving.

The setting of the driver information system is advantageously carried out in the form of a presetting. In order to get a user-defined presetting of a driver information system, preliminary decisions based on operating data are "learned". For the purpose of making preliminary decisions with the aid of the information system, we refer to the constantly adjusted, user-defined decision matrix. Thus, operating data on the past driving behavior of the vehicle user are used for presetting the driver information system, so as to be able to make preliminary decisions which, with high probability, will arise in the future in the case of the same vehicle user, in a corresponding operating situation.

According to one preferred variant of an embodiment, the decision matrix is adjusted using ascertained, situation-dependent and decision-relevant operating data. In this manner, there is constantly a comparison between the data already stored in the decision matrix, which relate to past operating data, and current operating data of the vehicle which were ascertained later. Thereby the decision matrix can be adjusted currently in a controlled manner.

It is of advantage, when setting up the decision matrix, to differentiate between operating data which are stable with respect to the respective user behavior and random operating data. In this context, stable operating data are understood to be data which, because of their repetitive appearance, may be drawn upon as the basis for reliably reaching a user-defined preliminary decision. In this connection, when differentiating between stable and random operating data, one may also refer to data that are already stored in the decision matrix. Furthermore, by random operating data are understood such data as are only unique or at least appear rarely, and thus are not able to be drawn upon as a basis for making preliminary decisions with the aid of which corresponding future operating situations can be predicted with a relatively high probability. Thus, differentiating between stable and random operating data makes possible updating the decision matrix for each vehicle user in a manner that is controlled and has data that are cleared up.

Advantageously, the decision matrix cooperates with a user-specific, permanent memory which is protected from external access by others. In the permanent memory, stable data or operating data which are needed for setting up the decision matrix, as well as random operating data are stored. Thus, a subdivision of the operating data into stable and random data can be carried out by comparison with data stored in the permanent memory. On the other hand, decisions based on stable operating data are stored in the decision matrix, whereby one can even differentiate between the respective vehicle users. The permanent memory is protected from other, external access—for example, by the vehicle user—so as not to allow undesired manual changes or corruption of the stored data by a person. Furthermore, the user-defined data in the permanent memory should be secured with respect to an ensured "privacy" (data protection).

Advantageously, if a preliminary decision cannot be made using the driver information system, a suggestion is proposed to the user of the vehicle. In case no preliminary decision can be made by the driver information system because of a lack of data in the decision matrix, preferably a suggestion is proposed to the user of the vehicle which can confirm or refuse. The driver information system can refer back to stored data for proposing a suggestion, these data not necessarily having to be user-defined, since there possibly are not yet any corresponding data present. In this context, it is even possible to draw upon the corresponding data of a suggestion for the purpose of setting up or updating the decision matrix.

According to one preferred variant of an embodiment, the comparison of the preliminary decision or the suggestion and a later, actually occurring user behavior is carried out, and is drawn upon for setting up or adjusting the user-defined decision matrix. With the use of such a comparison, it is possible, in a reliable and effective manner, to carry out a feedback, by which an adaptive updating of an existing, personal decision matrix or the setting up of a new decision matrix can be carried out, while taking into consideration the later behavior of the user (driving behavior, confirmation or refusal of the suggestion), occurring with reference to the preliminary decision or the suggestion.

Preferably, the preliminary decision or the suggestion are displayed by a display unit, and, if necessary, are confirmed, changed or refused. Because of the possibility for the vehicle user actively to confirm, change or refuse a preliminary decision or a suggestion, a user behavior not yet learned by the driver information system or a new user behavior may be supplemented in an effective and rapid manner in the driver information system. An adjustment of the decision matrix can, however, only take place if the actual behavior of the vehicle user, occurring later, confirms the corresponding prediction or the change.

Advantageously, user-specific data and/or operating data are input into an adaptive unit of the driver information system with the aid of a portable and preferably programmable memory unit. Such a memory unit may, for example, be a so-called "smart card" or a hand-held computer, which contains stored, user-specific data or operating data, which can be meaningful to the vehicle user for making a preliminary decision or for proposing a suggestion.

Preferably, a data exchange takes place between the memory unit and the permanent memory. In this way, user-specific data or operating data may be transmitted both from the memory unit to the permanent memory and from the latter to the memory unit. Furthermore, if necessary, data may be entered manually by the vehicle user into the memory unit, possibly before starting the trip, such as in the form of a destination determination, which then, after producing an operative connection between memory unit and adaptive unit is transmitted to the permanent memory at the start of the trip.

It is of advantage if, before a data exchange between the memory unit and the permanent memory, a user-defined confirmation inquiry with the aid of the driver information system takes place. It is ensured by such a confirmation inquiry that user-defined data are not accessible to third parties. Such a confirmation inquiry can, for example, be made in the form of a secret code.

The present invention also relates to an information device which is operated by a method having one of the above features.

Additional advantageous embodiments of the present invention are derived from the description.

BRIEF DESCRIPTION OF THE DRAWINGS

The present invention is explained below in detail in an exemplary embodiment, using an appropriate drawing. In this connection, the only FIGURE shows a block diagram of a driver information system according to the present invention.

DETAILED DESCRIPTION

Figure 1:
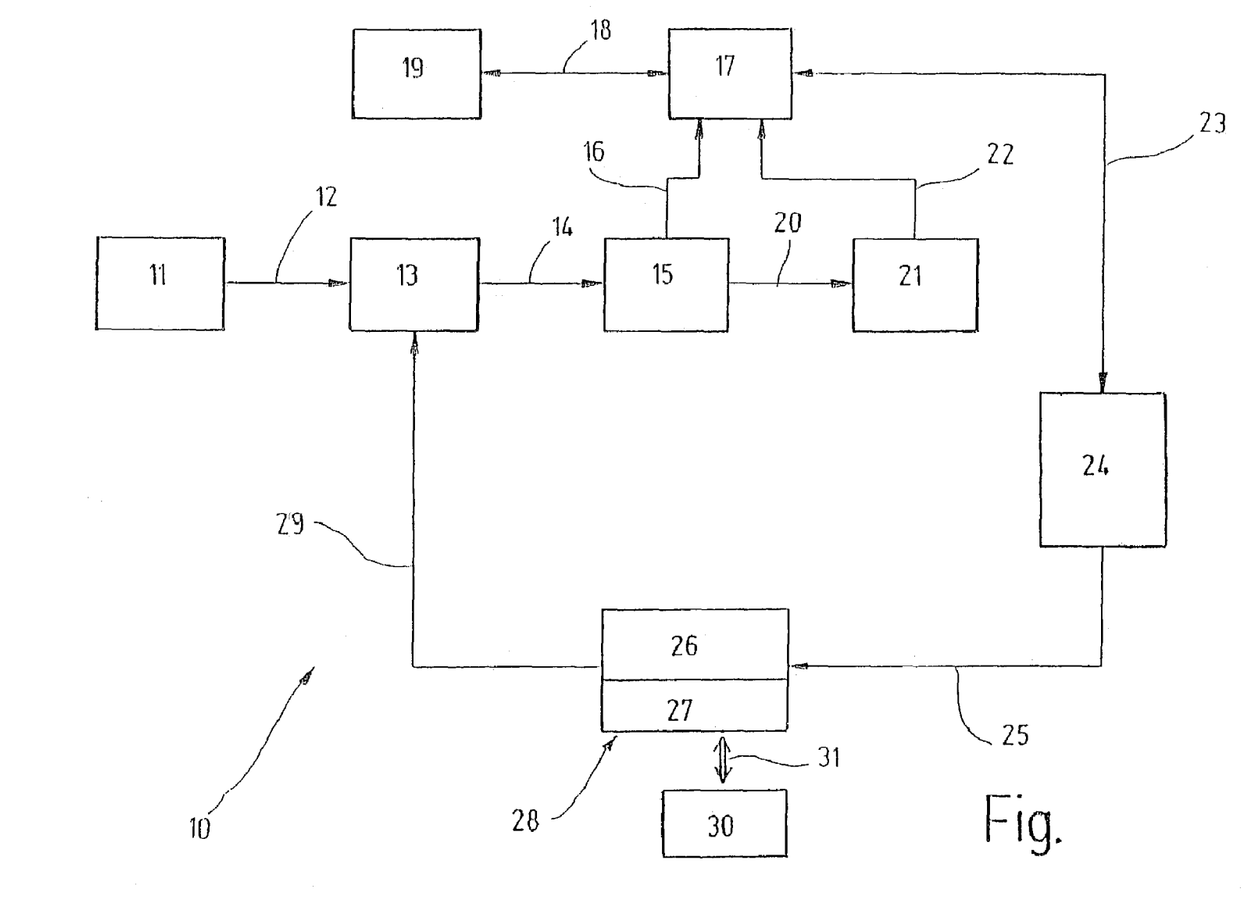

The block diagram shown in the FIGURE shows a driver information system generally denoted by 10, such as a navigation system of a vehicle. Driver information system 10 has an information unit 11, with the aid of which input data, preferably in the form of extracted, user-defined operating data are made available for further processing in driver information system 10. Information unit 11 is operatively connected to a processing unit 13 with the aid of a data transmission line shown as arrow 12. Processing unit 13 is used for situation registration and decision-making, taking into account the input data transmitted by information unit 11. Processing unit 13 is operatively connected, on its output side by way of a data transmission line shown as arrow 14, to a preliminary decision unit 15, and on its input side by way of a further data transmission line shown as arrow 29 to a decision matrix 26 of an adaptive unit 28. The user-defined decisions are stored in decision matrix 26, and they are drawn upon for decision-making in processing unit 13. Preliminary decision unit 15 is operatively connected to a reconstruction unit 17 with the aid of a data transmission line shown as arrow 16. Reconstruction unit 17 is used for comparing preliminary decisions taken with later occurring, actual user behavior, and to make available information or data resulting from this comparison for further processing. Thus, with the aid of reconstruction unit 17, a linkage takes place of a situation-defined behavior of the vehicle user with a corresponding preliminary decision. Reconstruction unit 17 is operatively connected to a display unit 19 with the aid of a data transmission line shown as double arrow 18. Display unit 19 is used for displaying a preliminary decision taken, and may possibly have an active functional unit (not shown) whereby the vehicle user is able to confirm and/or change the preliminary decision.

If, in view of missing data of decision matrix 26, preliminary decision unit 15 is not able to make a preliminary decision, a suggestion is proposed to the vehicle user with the aid of driver information system 10. For this purpose, preliminary decision unit 15 is operatively connected to a suggestion unit 21, via a data transmission line shown as arrow 20, which, under consideration of user-specific, and possibly also generally valid data, develops a suitable suggestion. Suggestion unit 21 is connected to reconstruction unit 17, via a data transmission line shown as arrow 22, which compares the data of the respective suggestion to the later, actual user behavior, and makes available corresponding data for further processing in driver information system 10. Each suggestion is first displayed in display unit 19, so that the vehicle user is able to confirm, change and/or refuse the suggestion, using the functional unit.

Reconstruction unit 17 is operatively connected to a feedback unit 24 with the aid of a data transmission line shown as double arrow 23. Feedback unit 24 is used for the adaptive updating, and thus for supplementing or adapting decision matrix 26 of adaptive unit 28. For this purpose, feedback unit 24 is operatively connected to decision matrix 26 via a data transmission line shown as arrow 25. In addition to decision matrix 26, adaptive unit 28 has a permanent memory 27, which cannot be accessed from the outside, for example, by the vehicle user. Permanent memory 27 contains decision-relevant and particularly ascertained, situation-dependent operating data, and is in operative contact with decision matrix 26 for setting up or adapting user-defined decision matrix 26.

The data transmission lines according to arrows 12, 14, 16, 18, 20, 22, 23, 25 and 29 are also able to be data transmission functions in the form of software.

In the case of the adaptive updating of decision matrix 26 by feedback unit 24, a differentiation is made between operating data that are stable with reference to the respective user behavior and random operating data. Both the stable and the random operating data are stored in permanent memory 27, so that, using a constant comparison of new operating data with the stored data in permanent memory 27, a differentiation is possible between stable and random operating data. The stable operating data are drawn upon for setting up or supplementing decision matrix 26, whereas the random operating data may possibly be used for working up a suggestion with the aid of suggestion unit 21.

A portable and preferably programmable memory unit 30 can be operatively connected to adaptive unit 28, for inputting user-specific data and/or operating data into it. Memory unit 30 is preferably designed as a so-called "smart card" or as a hand-held computer. In this context, a data exchange can take place between memory unit 30 and permanent memory 27. Thus, data are transmitted from memory unit 30 into permanent memory 27 and/or from the latter into memory unit 30. Before the data exchange between memory unit 30 and permanent memory 27, a user-defined confirmation inquiry takes place, using driver information system 10. But it is also possible to use permanent memory 27 for the user-defined setting of driver information system 10, without necessarily having to refer to data of memory unit 30.

The vehicle user is able, for example to input user-specific data into adaptive unit 28, using a smart card (portable memory unit 30), and subsequently, to input his particular intended travel destination, for instance, for calculating travel time. By using user-defined decision matrix 26, processing unit 13 sets up a speed profile, in order to calculate as accurately as possible a forecast with respect to the travel time asked for. Preliminary decision unit 15 makes a corresponding preliminary decision with respect to travel time and passes it on to reconstruction unit 17, which transmits a corresponding information to display unit 19. The vehicle user thus infers from display unit 19 how much time he most probably will need to reach his travel destination, in consideration of his retrieved speed profile. At the end of the trip, a comparison is made in reconstruction unit 17 between the preliminary decision and the actual travel time (actual speed profile), and corresponding data are passed on to feedback unit 24. Feedback unit 24 transmits corresponding data to decision matrix 26, which, under consideration of data or information (stable or random) stored in the permanent memory, is adjusted in such a way that, if necessary, a new, updated and user-defined speed profile will be stored. Because of the differentiation between stable and random data, it is avoided that a random, rare speed profile is stored in decision matrix 26, since the latter, according to its function, is supposed to include only stable data. In a corresponding manner, however not by the use of decision matrix 26, a suggestion is developed by driver information system 10, and is processed further, if necessary, for the supplementation of decision matrix 26.

Besides the user-specific speed profile, for example, the following decision criteria may be drawn upon for the adjustment with the aid of driver information system 10:

preferred road type (e.g. expressway or country road), preferred sequence of certain menu options, preferred "web links" (homepage) in the style of disposable internet services or other decision criteria in which prediction of user behavior represents a simplification in the operation of the vehicle for the user.

Advantageously, by using driver information system 10, vehicle user-defined decisions become predictable without thereby making private knowledge about each vehicle user accessible to third parties. A markedly simplified user prompting is made possible, for example with the aid of a so-called "human-machine interface" (HMI). Decisions are taken away from the vehicle user, so that he can concentrate better on his surroundings, thereby increasing driving safety.

What is claimed is:

1. A method for user-defined setting of a driver information system, comprising:
    storing data, the data being retrievable for making a decision;
    generating a user-defined decision matrix, the user-defined decision matrix being adjusted as a function of operating data and being used for making a preliminary decision assisted by the driver information system, wherein the user defined decision matrix cooperates with a user-specific permanent memory for user-defined adjustment of the driver information system so that the permanent memory is protected from further external access; and
    adjusting the user-defined decision matrix using ascertained, situation-dependent and decision-relevant operating data of a vehicle;
    wherein the adjusting of the user-defined decision matrix further includes differentiating between stable operating data with respect to a respective user behavior and random operating data.

2. An information device for user-defined setting of a driver information system, comprising:
    an arrangement configured to store data, the data being retrievable for making a decision;
    an arrangement configured to generate a user-defined decision matrix, the user-defined decision matrix being adjusted as a function of operating data and being retrievable for making a preliminary decision assisted by the driver information system wherein the user-defined decision matrix cooperates with a user-specific permanent memory for user-defined adjustment of the driver information system so that the permanent memory is protected from further external access; and
    an adjusting arrangement to adjust the user-defined decision matrix using ascertained, situation-dependent and decision-relevant operating data of a vehicle;
    wherein the adjusting of the user-defined decision matrix further includes differentiating between stable operating data with respect to a respective user behavior and random operating data.

3. The device as recited in claim 2, wherein the driver information system is operated as a navigation system.

4. The device as recited in claim 2, wherein the generating is performed as a preliminary adjustment.

5. The device as recited in claim 2, wherein a suggestion is presented to a user of a vehicle if a preliminary decision cannot be made using the driver information system.

6. The device as recited in claim 5, further comprising:
    a comparing arrangement to compare at least one of the preliminary decision and the suggestion to a later, actually-occurring user behavior, wherein the comparison is used for one of the setting of the user-defined decision matrix and adjusting of the user-defined decision matrix.

7. The device as recited in claim 5, further comprising:
    a displaying arrangement to display one of the preliminary decision and the suggestion by a display unit, wherein, if necessary, the at least one of the preliminary decision and the suggestion are confirmed, changed or refused by the user of the vehicle.

8. An information device for user-defined setting of a driver information system, comprising:
    an arrangement configured to store data, the data being retrievable for making a decision;
    an arrangement configured to generate a user-defined decision matrix, the user-defined decision matrix being adjusted as a function of operating data and being retrievable for making a preliminary decision assisted by the driver information system wherein the user-defined decision matrix cooperates with a user-specific permanent memory for user-defined adjustment of the driver information system so that the permanent memory is protected from further external access;
    an adjusting arrangement to adjust the user-defined decision matrix using ascertained, situation-dependent and decision-relevant operating data of a vehicle, wherein the adjusting of the user-defined decision matrix further includes differentiating between stable operating data with respect to a respective user behavior and random operating data;

a presenting arrangement to present a suggestion to a user of a vehicle if a preliminary decision cannot be made using the driver information system;

a comparing arrangement to compare at least one of the preliminary decision and the suggestion to a later, actually-occurring user behavior, wherein the comparison is used for one of the setting of the user-defined decision matrix and adjusting of the user-defined decision matrix; and a displaying arrangement to display one of the preliminary decision and the suggestion by a display unit, wherein, if necessary, the at least one of the preliminary decision and the suggestion are confirmed, changed or refused by the user of the vehicle.

9. The device as recited in claim 8, further comprising:

an inputting arrangement to input at least one of user-specific data and the operating data into an adaptive unit of the driver information system using a portable memory unit.

10. The device as recited in claim 9, further comprising:

a data exchange arrangement to perform a data exchange between the portable memory unit and a permanent memory.

11. The device as recited in claim 10, wherein a user-defined confirmation inquiry assisted by the driver information system is performed before the data exchange between the portable memory unit and the permanent memory is performed.

12. A method for user-defined setting of a driver information system, comprising:

storing data, the data being retrievable for making a decision;

generating a user-defined decision matrix, the user-defined decision matrix being adjusted as a function of operating data and being used for making a preliminary decision assisted by the driver information system, wherein the user defined decision matrix cooperates with a user-specific permanent memory for user-defined adjustment of the driver information system so that the permanent memory is protected from further external access;

adjusting the user-defined decision matrix using ascertained, situation-dependent and decision-relevant operating data of a vehicle, wherein the adjusting of the user-defined decision matrix further includes differentiating between stable operating data with respect to a respective user behavior and random operating data;

presenting a suggestion to a user of a vehicle if a preliminary decision cannot be made using the driver information system;

comparing at least one of the preliminary decision and the suggestion to a later, actually-occurring user behavior, wherein the comparison is used for one of the setting of the user-defined decision matrix and adjusting of the user-defined decision matrix; and displaying one of the preliminary decision and the suggestion by a display unit, wherein, if necessary, the at least one of the preliminary decision and the suggestion are confirmed, changed or refused by the user of the vehicle.

13. The method as recited in claim 12, further comprising:

inputting at least one of user-specific data and the operating data into an adaptive unit of the driver information system using a portable memory unit.

14. The method as recited in claim 13, further comprising:

performing a data exchange between the portable memory unit and a permanent memory.

15. The method as recited in claim 14, further comprising:

performing a user-defined confirmation inquiry assisted by the driver information system before the data exchange between the portable memory unit and the permanent memory is performed.

* * * * *

UNITED STATES PATENT AND TRADEMARK OFFICE
CERTIFICATE OF CORRECTION

PATENT NO. : 7,035,732 B2  
APPLICATION NO. : 10/297560  
DATED : April 25, 2006  
INVENTOR(S) : Hessling et al.

It is certified that error appears in the above-identified patent and that said Letters Patent is hereby corrected as shown below:

On the face of the patent, #(57) under the heading "ABSTRACT", line 1, change "The method is used" to --A method--

On the face of the patent, #(57) under the heading "ABSTRACT", line 2, delete "(10)"

On the face of the patent, #(57) under the heading "ABSTRACT", line 3, change "making a decision." to --making a decision is provided.--

On the face of the patent, #(57) under the heading "ABSTRACT", line 4, delete "(26)"

On the face of the patent, #(57) under the heading "ABSTRACT", line 7, delete "(10)"

Column 1, line 3, insert heading "FIELD OF THE INVENTION"

Column 1, lines 6-7, change "making a decision, according to the definition of the species in claim 1." to --making a decision.--

Column 1, lines 11-12, change "Methods of the kind named at the beginning are known. They are drawn upon specially" to --Methods for the user-defined setting of a driver information system may be used--

Column 1, line 14, change "is done" to --may be done--

Column 1, line 14, change "user himself by manual input" to --user by manually inputting--

Column 1, line 16, change "As a matter of disadvantage" to --A disadvantage of using such information systems is that--

Column 1, line 17, change "operating situation, using such information systems," to --operating situations,--

Column 1, line 18, delete "are repeatedly interrogated"

Column 1, line 19, change "vehicle user" to --vehicle user may be repeatedly interrogated--

UNITED STATES PATENT AND TRADEMARK OFFICE
CERTIFICATE OF CORRECTION

PATENT NO.         : 7,035,732 B2
APPLICATION NO. : 10/297560
DATED                 : April 25, 2006
INVENTOR(S)       : Hessling et al.

It is certified that error appears in the above-identified patent and that said Letters Patent is hereby corrected as shown below:

Column 1, line 22, delete "OF THE INVENTION"

Column 1, line 24, change "according to the present invention" to --according to an exemplary embodiment of the present invention--

Column 1, lines 24-25, change "is characterized by" to --may include--

Column 1, line 27, delete "the purpose of"

Column 1, line 41, change "is relatively high." to --may be relatively high.--

Column 1, line 42, change "Advantageously, the driver information system works" to --The driver information system may possibly work--

Column 1, line 44, change "user or must" to --user or may need to--

Column 1, line 47, change "in this way" to --in this manner--

Column 1, lines 52-53, change "is advantageously carried out" to --maybe carried out--

Column 1, line 56, change "For the purpose of making" to --The constantly adjusted, user-defined decision matrix is referred to for making--

Column 1, lines 57-58, delete ", we refer to the constantly adjusted, user-defined decision matrix"

Column 1, line 62, change "will arise" to --may arise--

Column 1, line 64, change "According to one preferred variant of an embodiment," to --According to an exemplary embodiment,--

Column 1, line 67, change "there is constantly a comparison" to --there may be a constant comparison--

Column 2, line 3, change "Thereby the decision matrix" to --The decision matrix can thereby--

Column 2, line 5, change "It is of advantage" to --It may be of advantage--

UNITED STATES PATENT AND TRADEMARK OFFICE
CERTIFICATE OF CORRECTION

PATENT NO.         : 7,035,732 B2
APPLICATION NO. : 10/297560
DATED                 : April 25, 2006
INVENTOR(S)       : Hessling et al.

It is certified that error appears in the above-identified patent and that said Letters Patent is hereby corrected as shown below:

Column 2, line 14, delete "by"

Column 2, line 15, change "such data as are only unique or at least appear rarely," to --to be such data as are unique at least appear only rarely--

Column 2, line 18, change "can be predicted" to --may be predicted--

Column 2, line 23, change "Advantageously, the decision matrix cooperates" to --The decision matrix may cooperate--

Column 2, line 26, change "which are needed" to --which may be needed--

Column 2, line 37, change "memory should be" to --memory may be--

Column 2, line 38-39, change "(data protection)." to --(i.e. data protection).--

Column 2, line 40, change "Advantageously, if" to --If--

Column 2, lines 41-42, change "is proposed" to -- may possibly be proposed--

Column 2, line 44, delete "preferably"

Column 2, line 45, change "is proposed" to --may possibly be proposed--

Column 2, line 46, change "confirm or refuse" to --be confirmed or refused--

Column 2, line 47, change "these data not" to --these data do not--

Column 2, line 48, change "having" to --have--

Column 2, lines 48-49, change "there possibly are" to "there are possibly"

Column 2, line 62, change "(driving behavior, confirmation or refusal of the suggestion)" to --(e.g., driving behavior, confirmation or refusal of the suggestion)--

Column 2, line 65, change "Preferably, the preliminary decision" to --The preliminary decision--

Column 2, lines 65-66, change "are displayed" to --may possibly be displayed--

UNITED STATES PATENT AND TRADEMARK OFFICE
CERTIFICATE OF CORRECTION

| | | |
|---|---|---|
| PATENT NO. | : 7,035,732 B2 | |
| APPLICATION NO. | : 10/297560 | |
| DATED | : April 25, 2006 | |
| INVENTOR(S) | : Hessling et al. | |

It is certified that error appears in the above-identified patent and that said Letters Patent is hereby corrected as shown below:

Column 2, line 66, change "and, if necessary, are" to --and may be--

Column 2, line 67, change "possibility" to --opportunity--

Column 3, line 6, change "can" to --may--

Column 3, line 9, change "Advantageously, user-specific" to --User-specific--

Column 3, line 10, change "are input" to --may possibly be input--

Column 3, line 11, change "preferably" to --possibly--

Column 3, line 17, change "Preferably, a data exchange takes place" to --A data exchange may take place--

Column 3, line 18, change "manner" to --way--

Column 3, line 21, delete "if necessary"

Column 3, line 24-25, change "determination, which then after producing" to --determination. After producing--

Column 3, line 25-26, change "between memory unit and adaptive unit is transmitted" to --between the memory unit and the adaptive unit, the data may be transmitted--

Column 3, line 28, change "It is" to --It may be--

Column 3, line 31, change "It is" to --It may be--

Column 3, line 36, change "having one of the" to --having one or more of the--

Column 3, lines 38-39, delete "Additional advantageous embodiments of the present invention are derived from the description."

Column 3, lines 43-45, delete "The present invention is explained below in detail in an exemplary embodiment, using an appropriate drawing. In this connection,"

Column 3, line 45, change "the only" to --The only--

UNITED STATES PATENT AND TRADEMARK OFFICE
CERTIFICATE OF CORRECTION

PATENT NO. : 7,035,732 B2
APPLICATION NO. : 10/297560
DATED : April 25, 2006
INVENTOR(S) : Hessling et al.

It is certified that error appears in the above-identified patent and that said Letters Patent is hereby corrected as shown below:

Column 3, line 46-47, change "the present invention." to --according to an exemplary embodiment of the present invention--

Column 3, line 51, change "shown in the FIGURE" to --of the figure--

Column 3, line 55, change "preferably" to --possibly--

Column 4, line 62, change "preferably" to --possibly--

Column 4, line 65, change "is preferably designed" to --may possibly be designed--

Column 5, line 11, change "his" to --a--

Column 5, line 16, change "asked for" to --requested--

Column 5, line 29, change "way that," to --manner that--

Column 5, line 29, delete "if necessary,"

Column 5, line 30, change "will be stored" to --may be stored--

Column 5, line 32, change "is avoided" to --maybe avoided--

Column 5, line 37, change "and is processed further," to --may be processed further--

Column 5, line 37, delete "if necessary,"

Column 5, line 43, change "menu options," to --menu options, and--

Column 5, line 48, change "Advantageously, by using" to --By using--

Column 5, line 53, change "Decisions are" to --decisions may be--

UNITED STATES PATENT AND TRADEMARK OFFICE
CERTIFICATE OF CORRECTION

PATENT NO.       : 7,035,732 B2
APPLICATION NO.  : 10/297560
DATED            : April 25, 2006
INVENTOR(S)      : Hessling et al.

It is certified that error appears in the above-identified patent and that said Letters Patent is hereby corrected as shown below:

Column 5, line 55, change "better on" to --more fully--

Signed and Sealed this

Thirtieth Day of October, 2007

JON W. DUDAS
*Director of the United States Patent and Trademark Office*